Jan. 10, 1928.
W. E. WINE
SIDE BEARING
Filed March 2, 1927
1,655,487
2 Sheets-Sheet 1
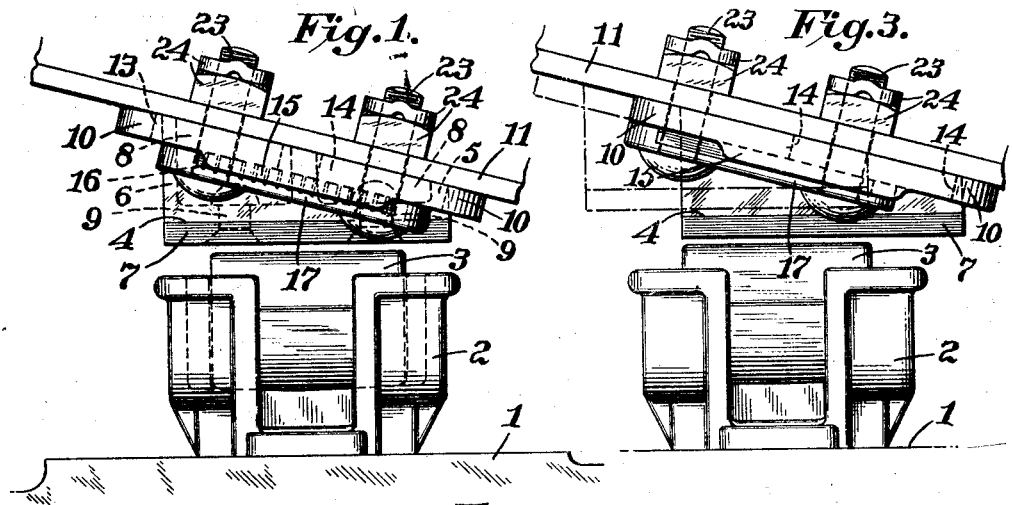
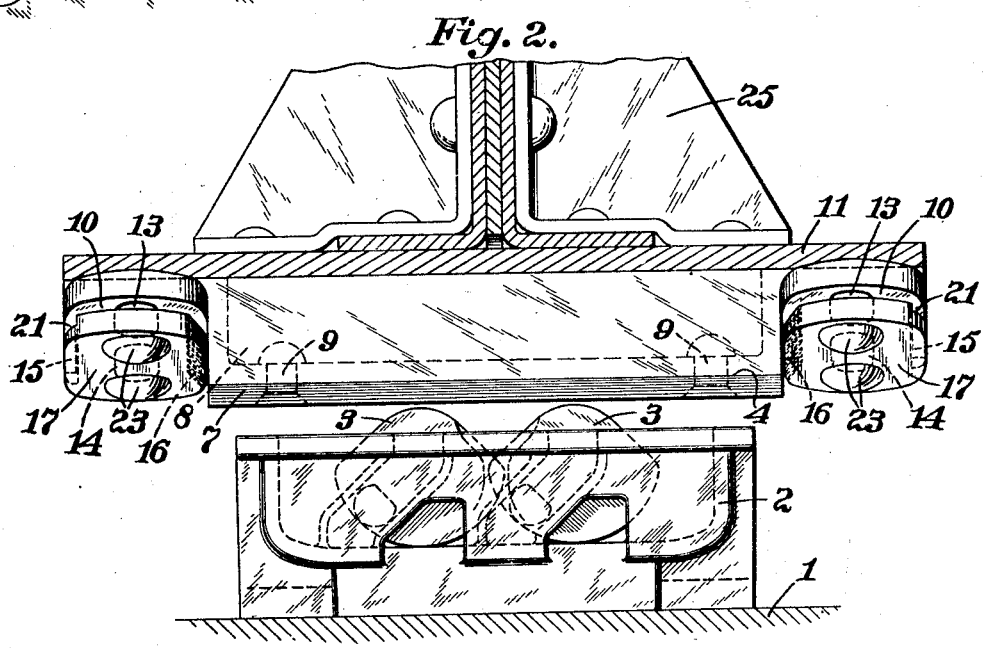
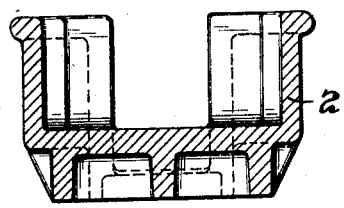
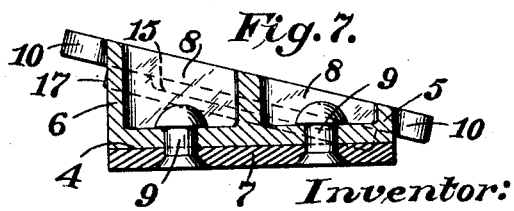
Inventor:
William E. Wine,
by Parker Cook Atty.

Jan. 10, 1928.
W. E. WINE
SIDE BEARING
Filed March 2, 1927
1,655,487
2 Sheets-Sheet 2
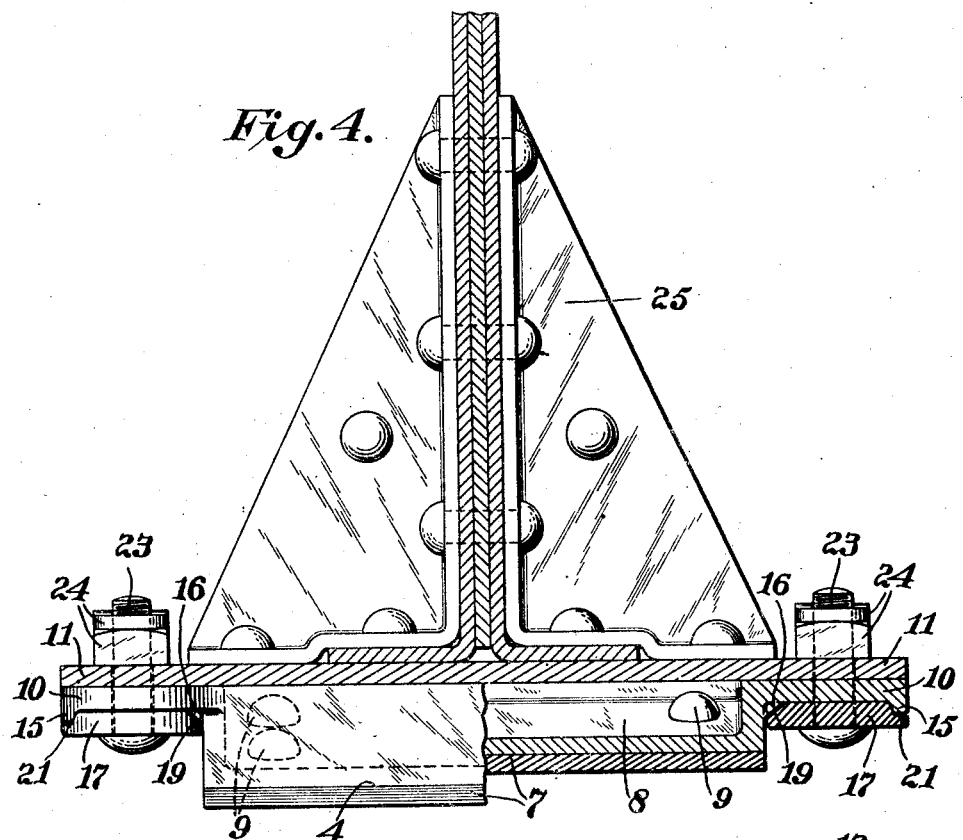
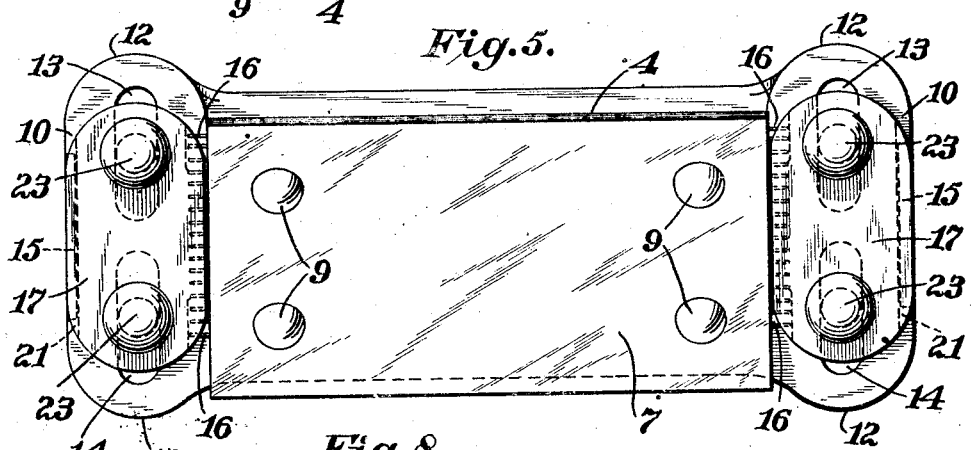
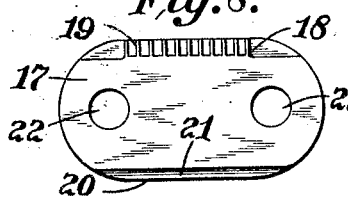
Inventor:
William E. Wine,
by Parker Cook.
Atty.

Patented Jan. 10, 1928.

1,655,487

UNITED STATES PATENT OFFICE.

WILLIAM E. WINE, OF TOLEDO, OHIO.

SIDE BEARING.

Application filed March 2, 1927. Serial No. 172,067.

My invention relates to new and useful improvements in side bearings and more particularly to the bolster bearing portion, and whereby the same may be adjusted with relation to the truck bearing to suit the various conditions present.

The present invention is a companion case to the two other cases just filed by me on side bearings, bearing the filing dates and serial numbers respectively as follows:

Filed February 23rd, 1927, Serial No. 170,389.

Filed March 1st, 1927, Serial No. 171,758.

The present application has to do with a form of body bolster bearing substantially in the shape of a wedge in transverse section and wherein means are provided at its ends for adjusting it up and down the natural slope of the inclined ends of the bolster.

One of the objects of the present invention is to provide the body bolster bearing with two wings or projections at its opposite ends, and to provide two small plates that cooperate with locking surfaces on the projections whereby the body bolster bearing may be adjusted to provide the proper clearance with the rollers of the truck bearing and there locked in position.

As is well known to those skilled in the art, certain tolerances are allowed in the center plates of the truck bolsters and furthermore, certain irregularities may be present in the center plates, whereby it is necessary to provide means for slightly regulating the body bolster bearing with regard to the truck bearing.

Furthermore, as the center plates wear or the body bolster settles, it is often found desirable to change the body bolster bearing in relation to the truck bearing.

With the above objects in view and other objects which will be more fully described, as the specification proceeds, the invention consists in certain new and novel arrangements and combination of parts, as will be hereinafter more fully described and pointed out in the claims.

Referring now more particularly to the drawings,

Fig. 1 is an end elevation showing the body and truck bearings in position and a fragmentary portion of the bolsters.

Fig. 2 is a side elevation of the two parts of the bearing and a portion of the bolster and its reinforcing plates.

Fig. 3 is an end elevation similar to Fig. 1, but with the body bolster bearing adjusted to its limit to the right in full lines and the dotted lines showing the limit of adjustment in the opposite direction.

Fig. 4 is a view similar to the upper half of Fig. 2, but taken on a line perpendicular to the incline of the body bolster, with part of the bearing being shown in elevation and part in section.

Fig. 5 is a bottom view of the body bearing.

Fig. 6 is a sectional view of the truck bearing housing.

Fig. 7 is a sectional view of the body bolster bearing, and

Fig. 8 is a detail plan of the small toothed plate used on each end of the body bearing.

Referring now more particularly to the drawings, there is shown in Fig. 1 a fragmentary portion 1 representing a truck bolster. Securely mounted on this bolster 1 is the housing 2, which contains the rollers 3. This housing and rollers as shown in the several views are of the well known "Wine" type and are shown in a co-pending application bearing Serial No. 94,751 and filed March 15, 1926.

It might be mentioned at this point that other forms of truck bearings might be used with this bolster bearing, the gist of the invention being that portion of the side bearing which is known as the "body bolster bearing".

Referring now more particularly to the gist of the invention, there is a solid casting, which is provided with a flat base and an upper inclined surface, clearly shown in cross section in Fig. 7.

This casting comprises the said base 4, the relatively short wall 5 and the longer wall 6, while securely riveted on the base itself is the wear plate 7.

The casting is provided with the internal pockets 8, while rivets 9 may be seen in the bottom walls of the pockets for holding the wear plate 7 in position.

Extending beyond the walls 5 and 6 may be seen the two wings or projections 10, these having the same inclined plane as the upper surface of the casting.

This casting, which is the body bearing, is designed to be secured to the sloping under surface of the body bolster 11, the upper inclined surface being such that the wear plate 7 on the base of the casting will be parallel with the upper surfaces of the rollers 3.

It will also be noticed, as in Fig. 3, that regardless of the set position of the casting, up and down the body bolster, the wear plate will always remain parallel with the upper surface of the rollers.

So far the casting, or body bolster bearing just described, is similar to the body bearing as set forth in the two previously referred to companion cases, but from this point it differs from those mentioned.

It might be well to refer to Figs. 4 and 5 for the moment, from which it will be seen that the wings 10 of the casting are somewhat extended and rounded as at 12 on their ends while in each of these wings 10, are formed the two slots 13 and 14. Also, as may be seen distinctly in Fig. 4, the upper surfaces of these ends 10 are provided at their extreme outer edge with the flange 15.

Still referring to Figs. 4 and 5, it will also be noticed that where the vertical walls of the casting merge with the outstanding wings or projections 10, there are a plurality of small notches or teeth 16. These teeth of course being present on both the extensions where they merge with the walls of the casting.

Referring now for the moment to Fig. 8, there is shown one of the small cooperative locking plates 17, its one edge 18 being slightly beveled and provided with the teeth 19 along the bevel to cooperate with the teeth 16. It will be seen that there are two of these plates, one for each end of the bearing, but a description of the one is a description of both.

The opposite edge 20 of the plate 17 is under cut as at 21, so that the edge 20 will ride along the bottom surface of the flange 15 of the wing 10 heretofore mentioned.

This little plate 17 has the two circular openings 22 therein, so that two bolts 23 may pass respectively through these openings 22 and fit within the heretofore mentioned slots 13 and 14, and then pass upwardly through the body bolster 11 and have threaded thereon the lock nuts 24.

In Fig. 4 the construction and arrangement is shown partly in section and partly in elevation and reinforcing brackets 25 of the body bolster are shown directly over the body bearing to take up the stresses at this point.

Supposing now it is desired to slightly adjust the body bearing with regard to the truck bolster bearing, say from the position shown in Fig. 1. It will first be necessary to loosen the lock nuts on the several bolts and slide the body bearing upwardly or downwardly of the incline of the bolster 11, this being possible as the plates 17 may be slightly pulled away from the wings 10 so that the teeth 16 and 19 will not mesh while the aforementioned slots in the wings 10 permit the bearing to be moved within the limits (the length of the slots), after which the little plates with their teeth will engage with the teeth 16 and the nuts 24 pulled up tightly on the bolts to thereby clamp the body bearing in place. Of course these little plates with the teeth will provide against any slipping or sliding movement of the bearing after the bearing is once locked in position.

From the foregoing, it will be seen that I have provided a side bearing wherein the body bearing is inclined to correspond with the natural inclination of the body bolster and whereby it may be adjusted within certain limits along this inclination, the base or wear plate of the bearing, however, at all times remaining parallel with the surface of the rollers.

Furthermore, it will be seen that the bearing may be adjusted from time to time to allow for the wear or to allow for the settling of the bolster or for any other reason, so that the proper clearances may be maintained throughout the life of the bearing.

It will also be seen that the manner of adjusting the bearings is exceedingly simple and there are but few parts to be manipulated during the adjustment.

Many slight changes might be made, without in any way departing from the spirit and scope of the invention.

Having thus described the same, what I claim as new and desire to secure by Letters Patent is:

1. A side bearing comprising a truck bearing and a bolster bearing, the bolster bearing being wedge shape in cross section and provided with wings at its end, said wings provided with slots therein and said wings also provided with a row of teeth, a small plate underlying and cooperating with each wing, teeth on said plates and each plate provided with an opening, means adapted to pass through the respective plates and slots in the wings for adjustably securing the body bearing to the bolster.

2. A side bearing comprising in part a body bearing wedge shape in cross section and provided with wings at its opposite ends, said wings provided with transverse slots, a small plate underlying and cooperating with each of the wings and each wing and plate being provided with teeth, bolts adapted to pass through the respective plates and slots in the wings and secured to a sloping surface of a body bolster, whereby the body bearing may be adjusted with regard to the plates and held in a locked position.

3. A side bearing comprising in part a body bearing, said body bearing comprising a casting wedge shape in cross section and provided with wings at its opposite ends, said wings lying in an inclined plane, the wings provided with a flange at one edge and teeth at the opposite edge, each of said wings provided with transverse slots, small clamping plates provided with teeth and undercut portions to cooperate with the teeth and flanges on the wings, means passing through the plates and through said slots and adapted to be clamped to a body bolster, whereby the casting may be moved up and down the said body bolster and locked in a set position.

4. A side bearing comprising in part a body bearing, the said body bearing having a base and an inclined upper surface, wings on said body bearing and located at the opposite ends thereof and lying in an inclined plane, each of said wings provided with two transverse slots, said wings provided with a plurality of small teeth on their under surface, and underlying clamping plate for each wing also provided with cooperating teeth, bolts passing through said plates and through said slots, whereby the said body bearing is adjustable with relation to said plates and means for clamping the plates and the body bearing to a bolster.

In testimony whereof I affix my signature.

WILLIAM E. WINE.